United States Patent [19]
Sakamoto

[11] Patent Number: 6,150,846
[45] Date of Patent: Nov. 21, 2000

[54] BUS CIRCUIT

[75] Inventor: Fumihiko Sakamoto, Tokyo, Japan

[73] Assignee: NEC Corporation, Tokyo, Japan

[21] Appl. No.: 09/187,106

[22] Filed: Nov. 5, 1998

[30] Foreign Application Priority Data

Nov. 5, 1997 [JP] Japan ..................................... 9-302290

[51] Int. Cl.$^7$ ....................... H03K 19/096; H03K 19/094
[52] U.S. Cl. ............................................... 326/86; 326/95
[58] Field of Search ................................. 326/86, 82, 93, 326/95, 98, 17

[56] References Cited

U.S. PATENT DOCUMENTS

| | | | |
|---|---|---|---|
| 5,115,150 | 5/1992 | Ludwig ........................................ | 326/86 |
| 5,148,047 | 9/1992 | Spohrer ....................................... | 326/86 |
| 5,189,319 | 2/1993 | Fung et al. .................................. | 326/86 |
| 5,661,417 | 8/1997 | Kondoh ....................................... | 326/87 |
| 5,661,675 | 8/1997 | Chin et al. .................................. | 364/768 |
| 5,831,451 | 11/1998 | Bosshart ...................................... | 326/93 |
| 5,856,752 | 1/1999 | Arnold ....................................... | 327/112 |
| 5,942,917 | 8/1999 | Chappell et al. .......................... | 326/121 |

FOREIGN PATENT DOCUMENTS

| | | |
|---|---|---|
| 61-58317 | 3/1986 | Japan . |
| 1-211014 | 8/1989 | Japan . |
| 2-135817 | 5/1990 | Japan . |
| 2-306325 | 12/1990 | Japan . |
| 3-74722 | 3/1991 | Japan . |

*Primary Examiner*—Michael Tokar
*Assistant Examiner*—Daniel D. Chang
*Attorney, Agent, or Firm*—Sughrue, Mion, Zinn, Macpeak & Seas, PLLC

[57] ABSTRACT

A bus circuit of this invention has a bus line. A bus input circuit and a bus output circuit are connected to the bus line. The bus line is charged by a precharge circuit. The bus output circuit outputs an output signal to the bus line by discharging or not discharging potential of the bus line. The bus input circuit inputs a signal from the bus line. The bus input circuit includes a feedback circuit which inputs potential of the bus line as the signal, amplifies the signal in accordance with a change of the signal, and feeds back the amplified result to the bus line.

18 Claims, 7 Drawing Sheets

BUS CIRCUIT

BACKGROUND OF THE INVENTION

The present invention relates to a bus circuit, and more particularly, to a bus circuit for signal transmission/reception by a plurality of circuit devices via a common bus signal line.

As an example of a conventional bus circuit of this type, Japanese Patent Application Laid-Open No. Sho 61-58317 discloses two conventional bus circuits.

Referring to FIGS. 5(A) through 5(C), a first conventional bus circuit 600 has a feedback circuit 610 and bus input/output circuits 671 and 672. The bus circuit 600 is a static-type bus circuit. The feedback circuit 610 comprises a hysteresis circuit 612 which receives a bus signal, a buffer 613 which receives an output from the hysteresis circuit 612, and a transfer gate transistor 614 which receives an output from the buffer 613. The transfer gate transistor 614 is in an off state during the first-half cycle of a data transfer period, then it is in an on state during the last-half cycle of the data transfer period for transmitting the output from the buffer 613 to a bus signal line 601.

If the circuit is designed such that the level V1 is lower than a low-level judgment level $V_L$ of the hysteresis circuit 612, a signal, which is obtained through the hysteresis circuit 612 and the buffer 613, accelerates the discharge potential on the bus signal line 601. When the transfer data signal is at a high level, high-speed operation is similarly attained by designing the circuit such that a rising voltage V2 of the bus signal line 601 in the first-half cycle of the data transfer cycle is higher than a high-level judgment level $V_H$. In the first conventional bus circuit, since a feedback circuit is additionally connected to the bus signal line 601, the hardware in the bus circuit and the amount of load on the bus signal line increase.

In FIGS. 6(a), 6(b) and 6(c), a bus circuit 700 includes a precharge transistor 702, a feedback circuit 710 and bus input/output circuits 771 and 772. The second conventional bus circuit 700 is a dynamic (precharge) type bus circuit. The feedback circuit 710 comprises a comparator 712 which receives a bus signal, a 2-input NOR gate 715, to which an output from the comparator 712 and a precharge signal $T_{PC}$ are inputted, and a pull-down transistor 713 which inputs an output from the 2-input NOR gate 715 as a gate input for pulling down a bus signal line 701. The feedback circuit 710 is connected to the bus signal line 701.

The bus signal line 701 is charged when the precharge transistor 702 is turned on by the precharge signal $T_{PC}$. When low level data is transferred in the data transfer cycle, the bus signal line 701 is discharged by discharge transistors 734 and 730 in the bus input/output circuit 771. When the level of the bus signal line 701 becomes lower than a low-level judgment level $V_L$ of the comparator 712 as shown in FIG. 6(c), the pull-down transistor 713 is turned on by the output of the NOR gate 15. While the feedback circuit 710 accelerates the discharge from the bus signal line 701, since the feedback circuit 710 is additionally connected to the bus signal line 701, the amount of hardware of the bus circuit and the load on the bus signal line also increase.

A third conventional bus circuit is disclosed in Japanese Patent Application Laid-Open No. Hei 2-135817.

Referring to FIG. 7, a third conventional bus circuit 800 has a bus signal line 801, a p-channel transistor 802, a driver (bus output circuit) 890, a receiver (bus input circuit) 880 and includes at least one discharge circuit (auxiliary circuit) 810a.

The p-channel precharge transistor 802 is turned on by the precharge signal $T_{PC}$ and charges the signal line 801 at a high level. Thereafter, when the bus selection signal $T_{OUT}$ is at a high level and the data signal $D_{in}$ is at a high level, the n-channel transistors 834 and 830 in the driver 890 turns on, and discharge from the bus signal line 801 is started through the driver 890. When the potential of the bus signal line 801 begins to decrease, the gate potential of a p-channel transistor 812 in the discharge circuit (auxiliary circuit) 810a decreases. Accordingly, the p-channel transistor 812 turns on, and a high potential is supplied from the power source line 803a to a gate of the n-channel transistor 813. As a result, the n-channel transistor 813 turns on, and a current flows from the bus signal line 801 to a ground line 800a, promoting the discharge from the bus signal line 801. In the third conventional bus circuit, however, since the discharge circuit (auxiliary circuit) 810a is additionally connected to the bus signal line 801, the amount of hardware of the bus circuit and the load on the bus signal line also increase.

A fourth conventional bus circuit is disclosed in Japanese Patent Application Laid-Open No. Hei 3-74722.

In FIG. 8, a fourth conventional bus circuit 900 includes a bus signal line 901 and a precharge transistor 902 which charges the bus signal line 901. As the precharge transistor 902 is an n-channel transistor, the bus signal line 901 turns on at an intermediate level. A bus input circuit 980 input a signal from the bus signal line 901 via a n-channel transistor 929. After the bus signal line 901 is charged by a precharge transistor 902, the bus control circuit 979 turns the precharge transistor 902 off by a signal on the precharge signal line 909. At the same time, the bus output control means 999 turns a bus output transistor 930 on, and drives the bus signal line 901 to a low level. As the bus signal line was at the intermediate level at the time of precharge, the bus signal line 901 can be driven in a shorter period. The n-channel transistor 919 is turned on by the precharge signal. As the level of the bus signal line 901 approaches the low level, the output of the inverter 912 becomes high. The n-channel transistor 913 is turned on, and the level of the bus signal line 901 immediately becomes low. However, since the auxiliary circuit is additionally connected to the bus signal line 901, the amount of hardware of the bus circuit and the load on the bus signal line also increase.

In the above described conventional bus circuits, a problem is created because the amount of hardware of the bus circuit increases due to addition of the auxiliary circuit to the bus signal line. Therefore, high integration of the bus circuit is prevented.

Moreover, since the auxiliary circuit is connected to the bus signal line, the amount of load on the bus signal line increases, which increases transmission delay time on the bus signal line. As a result, high speed operation is prevented. Further, the operation cycle period of the bus circuit cannot be reduced, and the transmission efficiency is lowered.

SUMMARY OF THE INVENTION

Accordingly, an object of the present invention is to provide a bus circuit with high integration.

Further, another object of the present invention is to provide a bus circuit that operates at a high speed.

Moreover, still another object of the present invention is to provide a bus circuit that improves transmission efficiency.

According to one aspect of the present invention, there is provided a bus circuit which comprises a bus line, a first circuit for outputting an output signal to, or inputting an input signal from, the bus line, and a second circuit provided in the first circuit. The second circuit inputs the potential of the bus line as a signal, amplifies the signal in accordance with a change of the signal, and feeds back the amplified result to the bus line.

According to another aspect of the present invention, there is provided a bus circuit which comprises a bus line, a precharge circuit which charges potential of the bus line, a bus output circuit which receives a data signal and outputs a signal to the bus line by discharging or not discharging the potential of the bus line in accordance with the data signal, a bus input circuit which input the signal from the bus line, and a first circuit provided in the output circuit or the input circuit, for helping the bus output circuit discharge the potential of the bus line when the bus output circuit discharges the potential of the bus line.

BRIEF DESCRIPTION OF THE DRAWINGS

Other features and advantages of the invention will be made more apparent by the detailed description hereunder taken in conjunction with the accompanying drawings, wherein.

In the drawings, the same reference numerals represent the same structural elements.

DETAILED DESCRIPTION OF THE PREFERRED EMBODIMENTS

The first embodiment of the bus circuit will be described in detail below.

Figure 1:
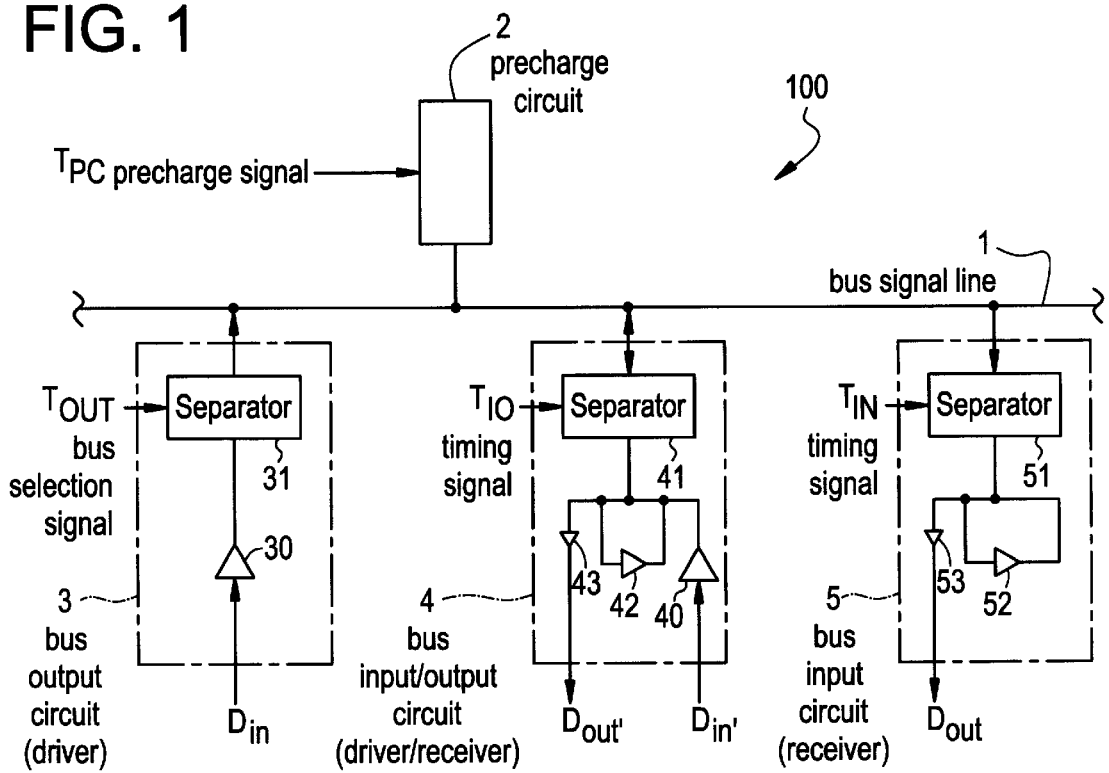
FIG. 1 is a block diagram showing a bus circuit of the present invention.

Referring to FIG. 1, a bus circuit 100 comprises a bus signal line 1, a precharge circuit 2, a bus output circuit 3 (bus driver), a bus input/output circuit 4 and a bus output circuit 5 (bus receiver). The bus signal line 1 is charged by the precharge circuit 2 in accordance with the timing of a precharge signal $T_{PC}$. The bus output circuit 3 is connected to the bus signal line 1. The bus output circuit 3 works as a driver for supplying data Din to the bus line 1. The bus input circuit 5 is connected to the bus line 1. The bus input circuit 5 works as a receiver for receiving data from the bus signal line 1. The bus input/output circuit 4 is connected the bus signal line 1. The bus input/output circuit 4 works as a driver and a receiver.

The bus output circuit 3 has a bus output component/circuit 30 and a separator 31. The bus output component/circuit 30 inputs the data Din and outputs the data to the bus signal line 1. The separator 31 electrically separates the bus output component/circuit 30 from the bus signal line 1. The bus input/output circuit 4 has a bus output component/circuit 40, a feedback circuit (auxiliary circuit) 42, a bus input component/circuit 43 and a separator 41. The bus output component/circuit 40 supplies data D'in to the bus signal line 1. The feedback circuit (auxiliary circuit) 42 detects a change of the bus signal line 1, amplifies the change and feeds back the amplified change to the bus signal line 1. The bus input component/circuit 43 outputs the amplified output D'out. The separator 41 electrically separates the bus input component/circuit 43, the feedback circuit 42 and the bus input component/circuit 40 from the bus signal line 1. The bus input circuit 5 has a feedback circuit (auxiliary circuit) 52, a bus input component/circuit 53 and a separator 51. The feedback circuit (auxiliary circuit) 52 detects change of the potential of the bus signal line 1, amplifies the change and feeds back the amplified change to the bus signal line. The bus input component/circuit 53 outputs the amplified output Dout. The separator 51 electrically separates the bus input component/circuit 53 and the feedback circuit 52 from the bus signal line 1. Timing signals $T_{OUT}$ (bus selection signal), $T_{IO}$ and $T_{IN}$ are supplied to the separators 31, 41 and 51, respectively. The separators 31, 41 and 51 are turned on and off in accordance with these timing signals, respectively. In the embodiment, while the bus signal line 1 is connected to one bus output circuit 3, one bus input/output circuit 4 and one bus input circuit 5, the number of these circuits may be arbitrarily determined. Further, the number of the precharge circuits 2 may be more than two.

Next, the operation of this embodiment is described below in detail.

First, all the separators 31, 41 and 51 separate the bus output circuit 3, the bus input/output circuit 4 and the bus input circuit 5 from the bus signal line 1 in accordance with the timing signals $T_{OUT}$, $T_{IO}$ and $T_{IN}$, respectively. Namely, the separator 31 of the bus output circuit 3 disconnects the bus output circuit 3 from the bus signal line 1. The separator 41 of the bus input/output circuit 4 disconnects the bus input/output circuit 4 from the bus signal line 1. The separator 51 of the bus input circuit 5 disconnects the bus input circuit 5 from the bus signal line 1. The bus signal line 1 is charged by the precharge circuit 2 to a predetermined potential in accordance with the precharge signal $T_{PC}$.

Next, the separator 31 of the bus output circuit 3 or the separator 41 of the bus input/output circuit 4 connects the bus output circuit 3 or the bus input/output circuit 4 to the bus signal line 1 in accordance with the bus selection signal $T_{OUT}$ or the timing signal $T_{IO}$, respectively. The bus output component/circuit 30 of the bus output circuit 3 or the bus output component/circuit 40 of the bus input/output circuit 4 operates to set the potential of the bus signal line 1 to a potential in accordance with the data signal Din or D'in, respectively. The separator 41 of the bus input/output circuit 4 or the separator 51 of the bus input circuit 5 connects the bus input/output circuit 4 or the bus input circuit 5 to the bus signal line 1 in accordance with change of the timing signal $T_{IO}$ or the $T_{IN}$, respectively. The bus input component/circuit 43 or 53 operates to input the potential of the bus signal line 1.

The output component/circuit 30 of the bus output circuit 3 or the bus output component/circuit 40 of the bus input/output circuit 4 may discharge the potential of the bus line 1 in accordance with the data signal which is input as Din or D'in. The feedback circuit 42 or 52 of the circuit 4 or 5, one of which is connected to the bus signal line 1, promotes the change of the potential inputted from the bus signal line 1 when the potential of the bus line 1 is discharged. Thus, the discharge response characteristic of the bus circuit is improved.

On the other hand, when neither the bus output component/circuit 30 of the bus output circuit 3 nor the bus output component/circuit 40 of the bus input/output circuit 4 discharge the potential of the bus signal line 1, since the potential of the bus signal line 1 does not change, the feedback circuit 42 or 52 of the circuit 4 or 5, one of which is connected to the bus signal line 1, does not operate. The potential inputted from the bus signal line 1 is maintained.

As described above, the feedback circuits (auxiliary circuits) 42 and 52 are provided in the bus input/output circuit 4 and the bus input circuit 5, respectively. Since the feedback circuits 42 and 52 improve the discharge characteristic of the precharge-type bus circuit, high-speed operation of the bus circuit is realized. Moreover, when the bus signal line 1 is charged, the feedback circuits 42 and 52 provided in the bus input/output circuit 4 and the bus input circuit 5, respectively, are separated from the bus signal line 1. Therefore, the load on the bus signal line 1 decreases. Accordingly, high-speed precharge operation can be performed, and further high-speed operation of the bus circuit can be realized.

Next, a second embodiment of the bus circuit will be described in detail below. A feature of the second embodiment is that a feedback circuit is provided in a bus output circuit. The other constituents are identical to those of the above described first embodiment.

Figure 2:
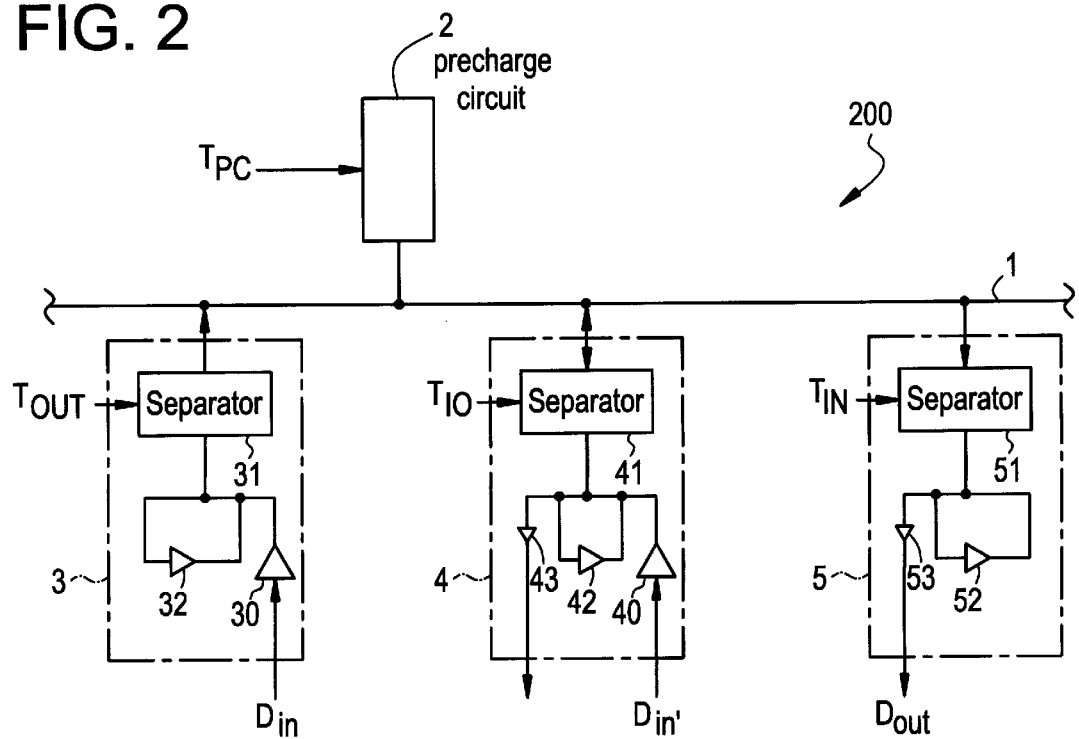
FIG. 2 is a block diagram showing a bus circuit according to the second embodiment of the present invention.

Referring to FIG. 2, an operation of this embodiment is described below in detail.

First, all the separators 31, 41 and 51 separate the bus output circuit 3, the bus input/output circuit 4 and the bus input circuit 5 from the bus signal line 1 in accordance with the timing signals $T_{OUT}$, $T_{IO}$ and $T_{IN}$, respectively. Namely, the separator 31 of the bus output circuit 3 disconnects the bus output circuit 3 from the bus signal line 1. The separator 41 of the bus input/output circuit 4 disconnects the bus input/output circuit 4 from the bus signal line 1. The separator 51 of the bus input circuit 5 disconnects the bus input circuit 5 from the bus signal line 1. The bus signal line 1 is charged by the precharge circuit 2 to a predetermined potential in accordance with the precharge signal $T_{PC}$.

The separator 31 of the bus output circuit 3 or the separator 41 of the bus input/output circuit 4 connects the bus output circuit 3 or the bus input/output circuit 4 to the bus signal line 1 in accordance with the bus selection signal $T_{OUT}$ or the timing signal $T_{IO}$, respectively. The bus output component/circuit 30 of the bus output circuit 3 or the bus output component/circuit 40 of the bus input/output circuit 4 operates to set the potential of the bus signal line 1 to a potential in accordance with the data signal Din or D'in, respectively.

The output component/circuit 30 of the bus output circuit 3 or the bus output component/circuit 40 of the bus input/output circuit 4 may discharge the potential of the bus line 1 in accordance with the data signal which is input as Din or D'in. The feedback circuit 32 or 42 of the circuit 3 or 4, one of which is connected to the bus signal line 1, promotes the change of the potential inputted from the bus signal line 1 when the potential of the bus line 1 is discharged. Thus, the discharge response characteristic of the bus circuit is improved.

On the other hand, when neither the bus output component/circuit 30 of the bus output circuit 3 nor the bus output component/circuit 40 of the bus input/output circuit 4 discharge the potential of the bus signal line 1, since the potential of the bus signal line 1 does not change, the feedback circuit 32 or 42 of the circuit 3 or 4, one of which is connected to the bus signal line 1, does not operate. The potential inputted from the bus signal line 1 is maintained.

Next, the separator 41 of the bus input/output circuit 4 or the separator 51 of the bus input circuit 5 connects the bus input/output circuit 4 or the bus input circuit 5 to the bus signal line 1 in accordance with a change of the timing signal $T_{IO}$ or the $T_{IN}$, respectively. The bus input component/circuit 43 or 53 operates to input the potential of the bus signal line 1.

When the output component/circuit 30 of the bus output circuit 3 or the bus output component/circuit 40 of the bus input/output circuit 4 discharges the potential of the bus line 1 in accordance with the data signal which is input as Din or D'in, the feedback circuit 42 or 52 of the circuit 4 or 5, one of which is connected to the bus signal line 1, promote the change of the potential inputted from the bus signal line 1 when the potential of the bus line 1 is discharged. Thus, the discharge response characteristic of the bus circuit is improved.

On the other hand, when neither the bus output component/circuit 30 of the bus output circuit 3 nor the bus output component/circuit 40 of the bus input/output circuit 4 discharge the potential of the bus signal line 1, since the potential of the bus signal line 1 does not change, the feedback circuit 42 or 52 of the circuit 4 or 5, one of which is connected to the bus signal line 1, does not operate. The potential inputted from the bus signal line 1 is maintained.

As described above, the feedback circuits 32, 42 and 52 are provided in the bus output circuit 3, bus input/output circuit 4 and the bus input circuit 5, respectively. Since the feedback circuits 32, 42 and 52 improve the discharge characteristic of the precharge-type bus circuit, high-speed operation of the bus circuit is realized. In addition, when the bus signal line 1 is charged, the feedback circuits 32, 42 and 52 provided in the bus output circuit 3, the bus input/output circuit 4 and the bus input circuit 5, respectively, are separated from the bus signal line. Therefore, the load on the bus signal line 1 decreases. Thus, high-speed precharge operation can be performed, and further high-speed operation of the bus circuit can be realized.

Next, a third embodiment of the bus circuit will be described in detail below.

Figure 3:
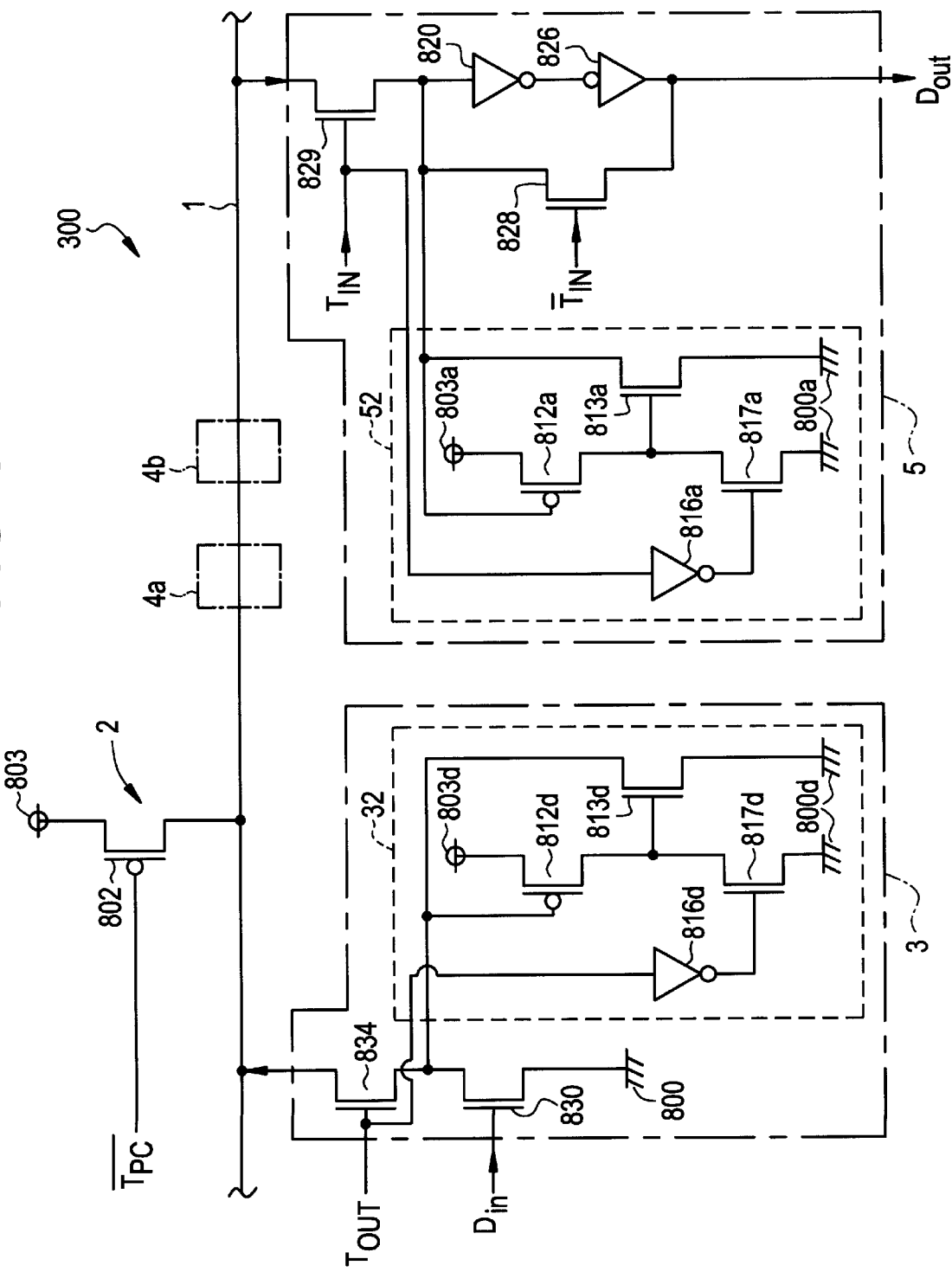
FIG. 3 is a circuit diagram showing a bus circuit according to the third embodiment of the present invention.

Referring to FIG. 3, a bus circuit 300 comprises a bus signal line 1, a precharge circuit 2, a bus output circuit 3, a bus input circuit 5 and/or bus input/output circuits 4a and 4b. The precharge circuit 2 includes a precharge transistor 802 (corresponding to the precharge circuit 2 in FIGS. 1 and 2). The p-channel transistor (precharge transistor) 802 charges the bus signal line 1. The p-channel transistor 802 has a drain connected to the bus signal line 1, a source connected to a positive-potential power supply source line 803, and a gate to which a precharge signal $T_{PC}$ bar is supplied.

The bus output circuit (driver) 3 includes two serially-connected n-channel transistors (corresponding to the bus output component/circuit) 834 and 830, and a feedback circuit (auxiliary circuits) 32. The n-channel transistor 834 has a drain connected to the bus signal line 1, a gate to which a bus selection signal $T_{OUT}$ is supplied, and a source connected to a drain of the n-channel transistor 830 and the feedback circuit 32. The n-channel transistor 830 has a gate to which a data signal Din is supplied, and a source connected to a ground line 800. The feedback circuit 32 discharges to improve the discharge response characteristic of the precharge-type bus circuit. The feedback circuit 32 includes a p-channel transistor 812d, a n-channel transistor 817d, an inverter 816d and n-channel transistor 813d. The p-channel transistor 812d has a source connected to a positive-potential power source line 803d, a gate externally connected to the source of the n-channel transistor 834 in the driver 3, and a drain connected to a drain of a n-channel transistor 817d. The n-channel transistor 817d has a gate connected to the bus selection signal $T_{OUT}$ via the inverter 816d, and a source connected to a ground line 800d. The n-channel transistor 813d has a drain externally connected to the source of the n-channel transistor 834 in the driver 3, a gate connected to the drain of the p-channel transistor 812d, a drain of the n-channel transistor 817d and a source connected to the ground line 800d.

The receiver 5 has an n-channel transistor 829, an n-channel transistor 828, an inverter 820, an inverter 826 and feedback circuit 52. The n-channel transistor 829 has a drain connected to the bus signal line 1, and a gate to which a timing signal $T_{IN}$ is supplied. The source of the n-channel transistor 829 is connected to an input of the inverter 820. An output of the inverter 820 is connected to an input of the inverter 826. An output of the inverter 826 is used in common with a source of the n-channel transistor 828. The n-channel transistor 828 has a drain connected to a source of the n-channel transistor 829, and a gate to which an inverted timing signal $T_{IN}$ bar is supplied.

The feedback circuit 52 includes a p-channel transistor 812a, a n-channel transistor 817a, an inverter 816a and an n-channel transistor 813a. The p-channel transistor 812a has a source connected to a positive-potential power source line 803a, a gate externally connected to the source of the n-channel transistor 829 in the receiver 5, and a drain connected to a drain of the n-channel transistor 817a. The n-channel transistor 817a has a gate connected to the timing signal $T_{IN}$ via the inverter 816a, and a source connected to a ground line 800a. The n-channel transistor 813a has a drain externally connected to the source of the n-channel transistor 829 in the receiver 5, a gate connected to a drain of a p-channel transistor 812a and the drain of the n-channel transistor 817a, and a source connected to the ground line 800a.

While the inside of the bus input/output circuits 4a and 4b is not shown in FIG. 3, circuits similar to the feedback circuits 32 and 52 may be added in the other bus input/output circuits 4a and 4b similar to the bus input circuit 5 or the bus output circuit 3. Furthermore, the number of the feedback circuits 32 and 52 is not limited to two.

Next, the operation of this embodiment is described below in detail.

First, a precharge operation is described. When the precharge signal $T_{PC}$ bar is at a low level, the p-channel precharge transistor 802 turns on. Since a current flows from the power source line 803 to the bus signal line 1 via the transistor 802, the potential of the bus signal line 1 becomes a high level. At this time, the bus selection signal $T_{OUT}$ and the timing signal $T_{IN}$ are at a low level, therefore, both the n-channel transistor 829 in the receiver 5 and the n-channel transistor 834 in the driver 3 are off. In the feedback circuits 32 and 52, the bus selection signal $T_{OUT}$ and the timing signal $T_{IN}$ at the low level are inverted and supplied via the inverters 816d and 816a to the gates of the n-channel transistors 817d and 817a, respectively. Accordingly, the n-channel transistors 817d and 817a turn on, and the n-channel transistors 813d and 813a turn off. Thus, the feedback circuits 32 and 52 do not influence the operation statuses of the driver 3 and the receiver 5. When the precharge signal $T_{PC}$ bar becomes a high level, the precharge transistor 802 turns off, however, the high level status of the bus signal line 1 is maintained.

Next, the bus selection signal $T_{OUT}$ becomes a high level, and the n-channel transistor (bus output means) 834 in the driver 3 is turned on. When the data signal Din is at a high level, since the n-channel transistor 830 in the driver 3 is on, the discharge from the bus signal line 1 is started by the driver 3. In the feedback circuit 32 of the driver 3, since the gate potential of the p-channel transistor 812d decreases, the p-channel transistor 812d turns on. At the same time, the high-level bus selection signal $T_{OUT}$ is inverted by the inverter 816d. The inverter 816d outputs the inverted low-level signal to the gate of the n-channel transistor 817d, and the n-channel transistor 817d turns off. Since the p-channel transistor 812d is on, a high potential is supplied from the power source line 803d to the gate of the n-channel transistor 813d. As a result, the n-channel transistor 813d turns on, which leads to current flow from the bus signal line 1 to the ground line 800d. Thus, the feedback circuit 32 helps the bus signal line 1 discharge, and the discharge response characteristic of the bus circuit 300 is improved.

On the other hand, when the data signal Din is at the low level, since the n-channel transistor (bus output means) 830 in the driver 3 is off, a high-level signal from the bus signal line 1 is inputted into the driver 3. In the feedback circuit 32 of the driver 3, the gate potential of the p-channel transistor 812 is a high level, and the p-channel transistor 812d turns off. At the same time, the inverter 816d inverts the high-level bus selection signal $T_{OUT}$ and outputs an inverted low-level signal to the gate of the n-channel transistor 817d. The n-channel transistor 817d turns off. At this time, because the p-channel transistor 812d is off, the gate of the n-channel transistor 813d is maintained at the low-level. As a result, the n-channel transistor 813d is kept off, and the feedback circuit 32 does not influence the operation of the driver 3. That is, the bus signal line 1 is maintained at the high level.

Next, the timing signal $T_{IN}$ is turned to the high level. The n-channel transistor 829 in the receiver 5 is turned on, and a signal, which transmits on the bus signal line 1 as an inverted data signal Din, is inputted from the bus signal line 1 into the receiver 5. At this time, as an inverted timing signal $T_{IN}$ bar is at a low level, the n-channel transistor 828 is off.

When the data signal $D_{in}$ is at the high level, the driver 3 has started to discharge from the bus signal line 1 as described above. According to potential change on the bus signal line 1 by this operation, in the feedback circuit 52 of the receiver 5, the gate potential of the p-channel transistor 812a decreases, and the p-channel transistor 812a turns on. At the same time, the inverter 816a receives and inverts the timing signal $T_{IN}$ at the high level, and outputs an inverted timing signal $T_{IN}$ to the gate of the n-channel transistor 817a. The n-channel transistor 817a turns off. Since the p-channel transistor 812a is on, a high potential is supplied from the power source line 803a to the gate of the n-channel transistor 813a. As a result, the n-channel transistor 813a turns on, which leads to current flow from the bus signal line 1 to the ground line 800a. Thus the feedback circuit 52 further helps the bus signal line 1 to discharge, and the discharge response characteristic of the bus circuit is further improved.

On the other hand, when the data signal $D_{in}$ is at the low level, the bus signal line 1 is maintained at the high level as described above. Since a high-level signal is inputted into the receiver 5, in the feedback circuit 52, the gate potential of the p-channel transistor 812a is the high level, and the p-channel transistor 812a turns off. At the same time, the inverter 816a receives and inverts the timing signal $T_{IN}$ at the high level, and outputs the inverted timing signal $T_{IN}$ to the gate of the n-channel transistor 817a. The n-channel transistor 817a turns off. At this time, as the p-channel transistor 812a is already off, the gate of the n-channel transistor 813a is maintained at the low level. As a result, the n-channel transistor 813a is kept off, and the feedback circuit 52 does not influence the operation of the receiver 5. That is, the high level signal on the bus signal line 1 is inputted.

In this embodiment, while the feedback circuits 32 and 52 are added to the inside of the driver 3 and the receiver 5, circuits that are the same as or similar to the feedback circuits 32 and 52, may be added to the inside of the other bus input/output circuits 4a and 4b connected to the bus signal line 1. In this case, the other bus input/output circuits 4a and 4b perform operations that are the same or similar to the above-described operation of the driver 3 or the receiver 5.

As described above, in the present invention, the plurality of feedback circuits 32 and 52 are provided inside the plurality of circuits such as the bus input circuit 5 and the bus output circuit 3. Further, the plurality of feedback circuits 32 and 52 are dispersed in the plurality of circuits. Thus, the discharge response characteristic of the precharge-type bus circuit is improved, thereby allowing high-speed operation of the bus circuit to be realized. In addition, when the bus signal line 1 is charged at the time of the precharge period, since the feedback circuits in the bus input circuit 5, the bus output circuit 3 or the bus input/output circuits 4a and 4b are separated from the bus signal line 1, the load on the bus signal line decreases. Accordingly, high-speed precharge operation is possible, and higher-speed bus circuit operation is realized.

Next, a fourth embodiment of the bus circuit will be described in detail below.

Figure 4:
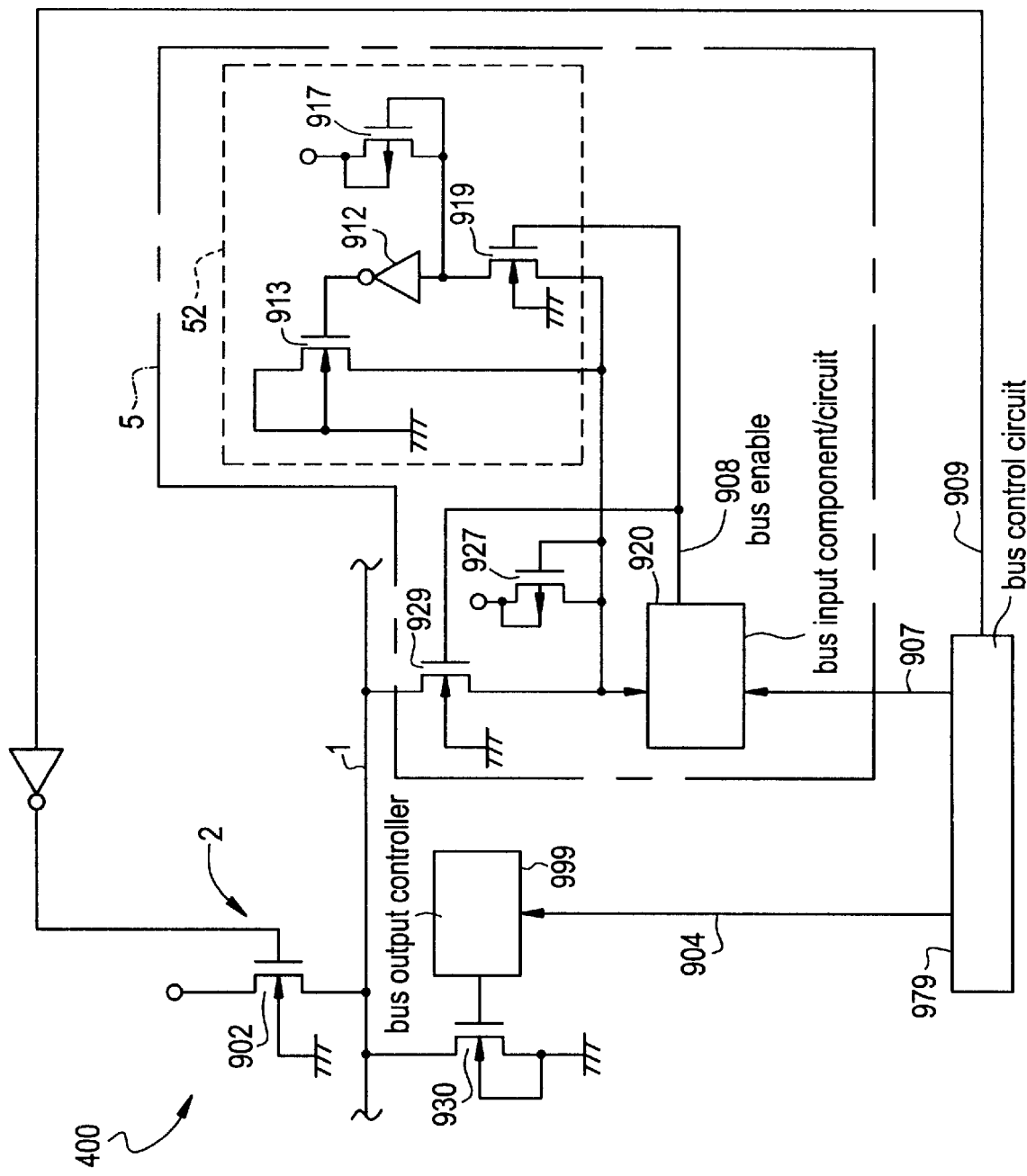
FIG. 4 is a circuit diagram showing a bus circuit according to the fourth embodiment of the present invention.
Figure 5A:
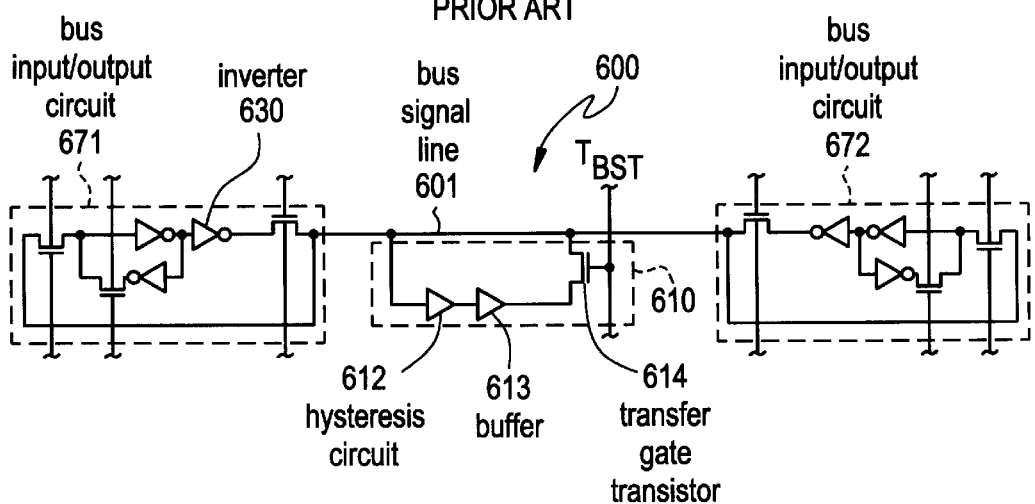
FIGS. 5(A) to 5(C) are a circuit diagram of the bus circuit of the first conventional bus circuit, an operation timing chart and an input/output characteristic diagram of the hysteresis circuit, respectively.
Figure 5B:
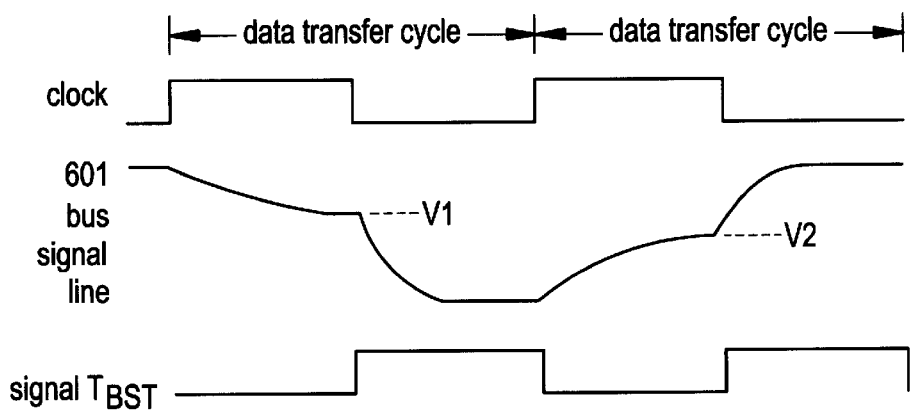
Figure 5C:
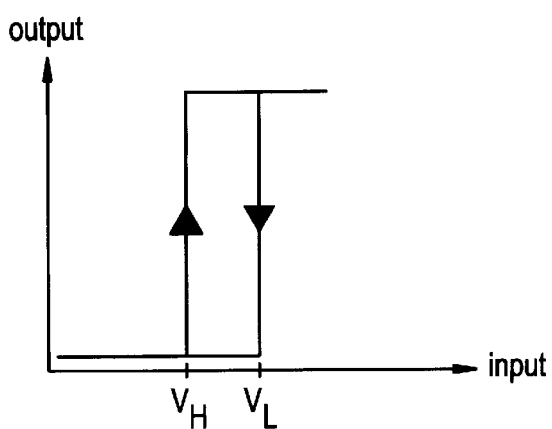
Figure 6A:
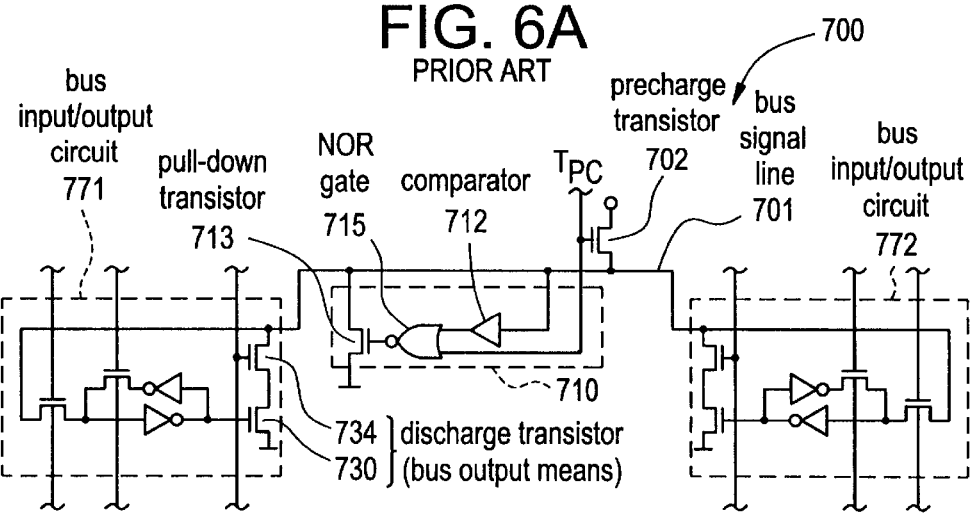
FIGS. 6(A) to 6(C) are a circuit diagram of the bus circuit of the second conventional bus circuit, an operation timing chart and an input/output characteristic diagram of the comparator used in the embodiment.
Figure 6B:
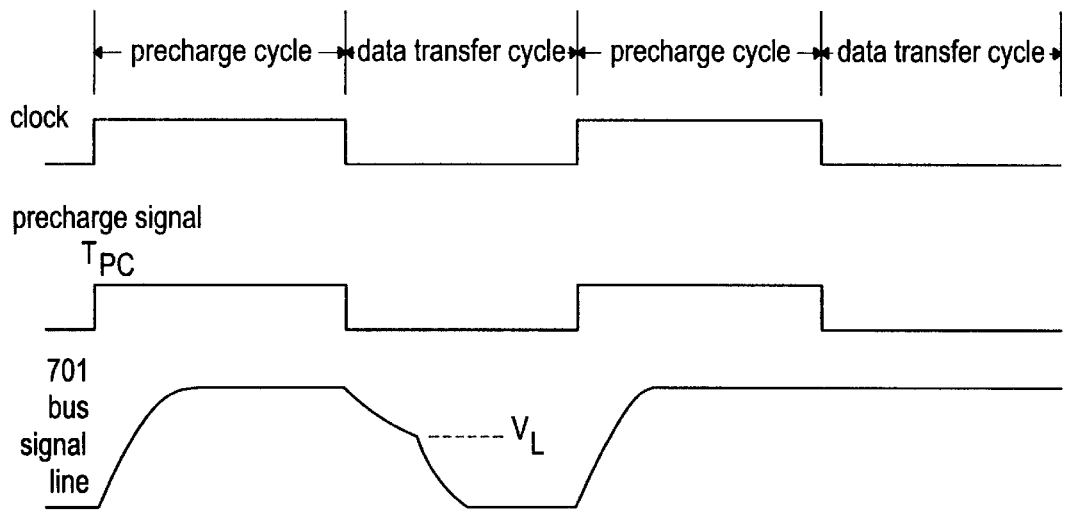
Figure 6C:
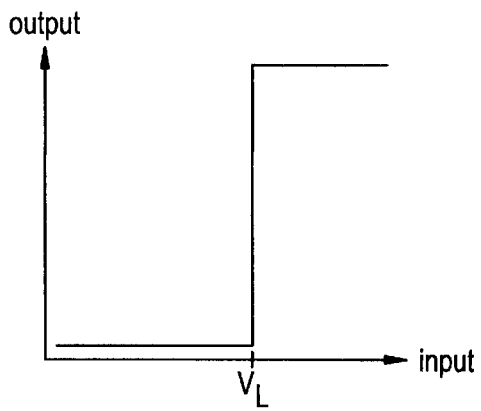
Figure 7:
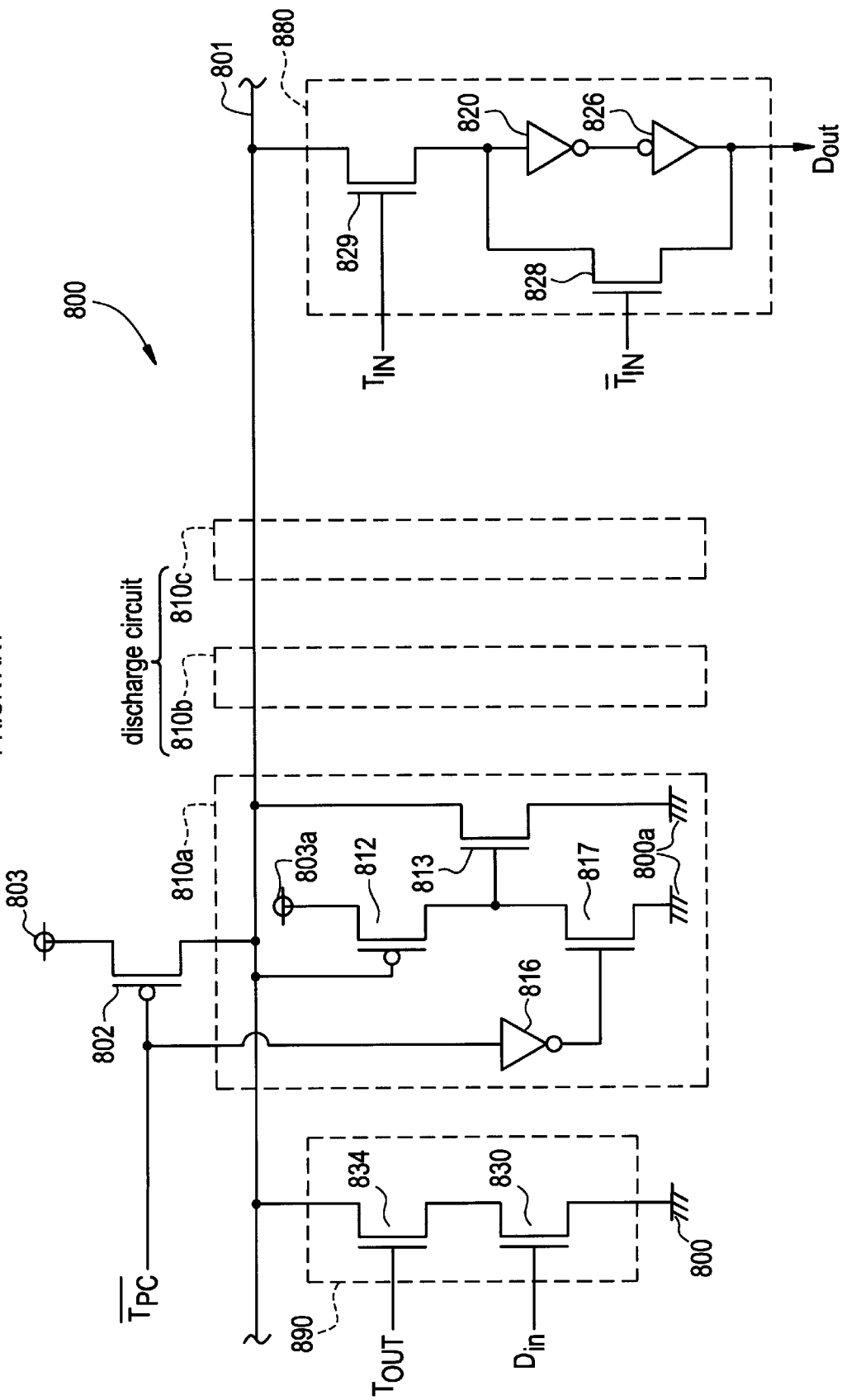
FIG. 7 is a diagram showing the construction of the bus circuit of the third conventional bus circuit.
Figure 8:
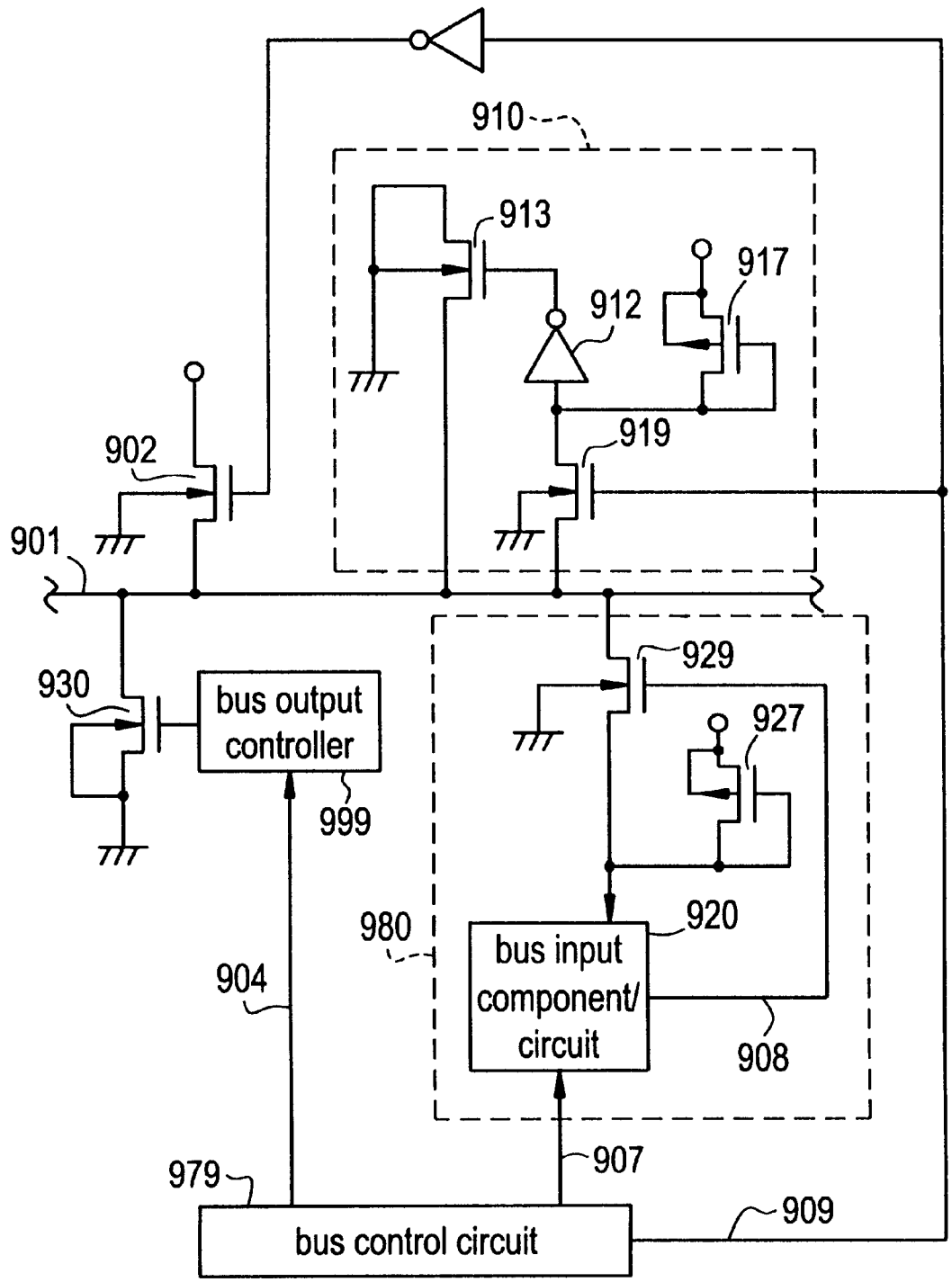
FIG. 8 is a diagram showing the construction of the bus circuit of the fourth conventional bus circuit.

In FIG. 4, the bus circuit 400 comprises a bus signal line 1, a precharge circuit 2, a bus output transistor 930, a bus output controller 999, a bus-output control signal line 904, a bus input circuit 5, a bus-input control signal line 907, a bus control circuit 979 and a precharge signal line 909. The precharge circuit 2 has a precharge transistor 902. The bus input circuit 5 includes a feedback circuit (auxiliary circuit) 52, p-channel transistor 927, n-channel transistor 929, a bus input component/circuit 920 and a bus-input enable signal line 908. The feedback circuit 52 includes n-channel transistors 913 and 919, an inverter 912 and p-channel transistor 917.

Next, the operation of the embodiment will be described below.

First, a precharge signal is outputted as a low-level signal from the bus control circuit 979 to the precharge signal line 909. The precharge transistor 902 charges the bus signal line 1 in accordance with the precharge signal. In this circumstance, as the precharge transistor 902 is an n-channel transistor, the bus signal line 901 is at an intermediate level. At this time, since a signal from the bus-input enable signal line 908 in the bus input circuit 5 is at a low level, the n-channel transistor 929 is off. On the other hand, the n-channel transistor 919 in the feedback circuit 52 is also turned off since the signal from the bus-input enable signal line 908 is at the low level. The p-channel transistor 917 turns an input of the inverter 912 to a high level. The level of an output of the inverter 912 becomes a low level, then the n-channel transistor 913 is turned off. Accordingly, the p-channel transistor 927 turns an input of the bus input component/circuit 920 to a high level.

Next, the bus control circuit 979 performs bus output operation and bus input operation. Specifically, the bus control circuit 979 turns the precharge signal on the precharge signal line 909 to a high level. The precharge transistor 902 is turned off. At the same time, the bus control circuit 979 outputs a bus-output control signal and a bus-input control signal to the bus-output controller 999 and the bus input circuit 5, respectively. The bus-output controller 999 turns the bus output transistor 930 on in accordance with the bus output control signal, and drives the bus signal line 1 to a low level. As the bus signal line was at the intermediate level at the time of the precharge period, the bus signal line 1 can be driven in a shorter period. On the other hand, since the bus input component/circuit 920 turns the bus-input enable signal to the high level in accordance with the bus-input control signal, the n-channel transistor 929 is turned on. Since the level of the bus-input enable signal is high, the n-channel transistor 919 in the feedback circuit 52 also turns on. As the level of the bus signal line 1 approaches the low level, since the level of the output of the inverter 912 becomes high, the n-channel transistor 913 turns on. Thus, a low-level signal is immediately inputted into the bus input component/circuit 920.

As described above, in this embodiment, the bus signal line 1 can be operated from the intermediate level in a short period. At the same time, since the feedback circuit 52, which helps the bus signal line 1 to discharge, is provided in the bus input circuit 5, the operation of the bus input signal can be accelerated. Thus, high-speed operation of the bus circuit can be realized. In addition, when the bus signal line 1 is charged at the time of precharge period, as the feedback circuit 52 of the bus input circuit 5 is separated from the bus signal line 1, the load on the bus signal line 1 decreases. Accordingly, high-speed precharge operation is possible, and higher-speed operation of the bus circuit can be realized.

An effect of this invention is that it is possible to highly integrate a bus circuit, since the invention realizes high-speed operation of the bus circuit with a smaller increase of hardware than that in the conventional circuits. This is because an auxiliary circuit, which helps the discharge operation, is provided inside the bus input circuit, the bus input/output circuit or the bus output circuit.

Furthermore, in this invention, the auxiliary circuit is separated from the bus signal line at the time of precharge period, therefore, the load on the bus signal line can be reduced. Therefore, high-speed precharge operation and higher-speed operation of the bus circuit can be realized. Thus, the invention reduces signal-transmission delay time in the bus circuit and reduces the operation cycle period of the bus circuit, which realize a bus circuit with improved speed performance and transmission efficiency performance.

While this invention has been described in conjunction with the preferred embodiments thereof, it will now readily be possible for those skilled in the art to put this invention into practice using various other manners.

What is claimed is:

1. A bus circuit comprising:
   a bi-directional bus line;
   a first circuit for outputting an output signal to or inputting an input signal from said bus line; and
   a second circuit provided in said first circuit, which receives a potential of said bus line, amplifies the received bus line potential in accordance with a change of said potential of said bus line, and feeds back the amplified result to said bus line.

2. The bus circuit as claimed in claim 1, further comprising:
   a precharge circuit which charges said potential of said bus line; and
   a separator circuit which electrically separates said first and second circuit from said bus line when said precharge circuit charges the potential of said bus line.

3. A bus circuit comprising:
   a bus line;
   a precharge circuit which charges a potential of said bus line:
   a bus output circuit which receives a data signal and outputs an output signal to said bus line by discharging or not discharging the potential of said bus line in accordance with said data signal; and
   a first circuit provided in said bus output circuit, for helping discharge the potential of said bus line when the potential of said bus line is discharged,
   wherein:
      said precharge circuit charges said potential of said bus line to a predetermined potential,
      said first circuit includes a second circuit for making a current path between said bus line and a power supply source whose potential is lower than said predetermined potential of said bus line, and
      said second circuit includes a first transistor which makes said current path, and a second transistor for controlling said first transistor when the potential of said bus line is reduced from said predetermined potential.

4. The bus circuit as claimed in claim 3, further comprising:
   a separator circuit which electrically separates said bus output circuit from said bus line when said precharge circuit charges said potential of said bus line.

5. The bus circuit as claimed in claim 3, wherein said first transistor has a control terminal, a first terminal connected to said bus line and a second terminal connected to said power supply source, and said second transistor has a control terminal connected to said bus line, a first terminal connected to a second power terminal source, and a second terminal connected to said control terminal of said first transistor.

6. A bus circuit comprising:
   a bus line;
   a precharge circuit which charges a potential of said bus line;
   a bus input circuit receives a signal from said bus line and transfers said signal by discharging or not discharging the potential of said bus line; and
   a first circuit provided in said bus input circuit, for helping the potential of said bus line be discharged when the potential of said bus line is discharged
   wherein:
      said precharge circuit charges said potential of said bus line to a predetermined potential, and wherein said first circuit includes a second circuit for making a current path between said bus line and a power supply source whose potential is lower than said predetermined potential of said bus line, and
      said second circuit includes a first transistor which makes said current path, and a second transistor for controlling said first transistor when the potential of said bus line is reduced from said predetermined potential.

7. The bus circuit as claimed in claim 6, further comprising:
   a separator circuit which electrically separates said bus input circuit from said bus line when said precharge circuit charges the potential of said bus line.

8. The bus circuit as claimed in claim 6, wherein said first transistor has a control terminal, a first terminal connected to said bus line and a second terminal connected to said power supply source, and said second transistor has a control terminal connected said bus line, a first terminal connected a second power terminal source, and a second terminal connected said control terminal of said first transistor.

9. A bus circuit comprising:
   a bus line;
   a precharge circuit which charges a potential of said bus line;
   a bus output circuit which receives a data signal and outputs an output signal to said bus line by discharging or not discharging the potential of said bus line in accordance with said data signal;
   a bus input circuit which inputs said output signal from said bus line;
   first circuit provided in said output circuit, for helping the potential of said bus line be discharged when the potential of said bus line is discharged; and
   a second circuit provided in said input circuit, for helping the potential of said bus line discharge when said potential of said bus line is discharged.

10. The bus circuit as claimed in claim 9, further comprising:
    a first separator circuit which electrically separates said bus output circuit from said bus line when said precharge circuit charges said potential of said bus line; and
    a second separator circuit which electrically separates said bus input circuit from said bus line when said precharge circuit charges said potential of said bus line.

11. The bus circuit as claimed in claim 9, wherein said precharge circuit charges said potential of said bus line to a predetermined potential, and wherein said first and second circuits include a third circuit for making a current path between said bus line and a power supply source whose potential is lower than said predetermined potential of said bus line.

12. The bus circuit as claimed in claim 11, wherein said third circuit includes a first transistor which makes said current path, and a second transistor for controlling said first transistor when the potential of said bus line is reduced from said predetermined potential.

13. The bus circuit as claimed in claim 12, wherein said first transistor has a control terminal, a first terminal connected to said bus line and a second terminal connected to said power supply source, and said second transistor has a control terminal connected to said bus line, a first terminal connected to a second power terminal source, and a second terminal connected to said control terminal of said first transistor.

14. A bus circuit comprising:
    a bi-directional bus line;
    a precharge circuit which charges a potential of said bus line;
    a bus input/output circuit which receives a data signal and outputs an output signal to said bus line by discharging or not discharging the potential of said bus line in accordance with said data signal, or inputs an input signal from said bus line; and a first circuit provided in said bus input/output circuit, for helping the potential of said bus line be discharged when the potential of said bus line is discharged.

15. The bus circuit as claimed in claim 14, further comprising:

a separator circuit which electrically separates said bus input/output circuit from said bi-directional bus line when said precharge circuit charges said potential of said bus line.

16. The bus circuit as claimed in claim 14, wherein said precharge circuit charges said potential of said bus line to a predetermined potential, and wherein said first circuit includes a second circuit for making a current path between said bus line and a power supply source whose potential is lower than said predetermined potential of said bus line.

17. The bus circuit as claimed in claim 16, wherein said second circuit includes a first transistor which makes said current path, and a second transistor for controlling said first transistor when the potential of said bus line is reduced from said predetermined potential.

18. The bus circuit as claimed in claim 17, wherein said first transistor has a control terminal, a first terminal connected to said bus line and a second terminal connected to said power supply source, and said second transistor has a control terminal connected to said bus line, a first terminal connected to a second power terminal source, and a second terminal connected to said control terminal of said first transistor.

* * * * *